United States Patent
Mitchell

(10) Patent No.: US 10,422,239 B2
(45) Date of Patent: Sep. 24, 2019

(54) SEAL ASSEMBLY IN A GAS TURBINE ENGINE

(71) Applicant: Siemens Energy, Inc., Orlando, FL (US)

(72) Inventor: David J. Mitchell, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 513 days.

(21) Appl. No.: 14/660,969

(22) Filed: Mar. 18, 2015

(65) Prior Publication Data

US 2016/0273374 A1 Sep. 22, 2016

(51) Int. Cl.
| | | |
|---|---|---|
| F01D 11/00 | (2006.01) |
| F01D 9/02 | (2006.01) |
| F01D 25/24 | (2006.01) |
| F16J 15/32 | (2016.01) |

(52) U.S. Cl.
CPC ............ F01D 11/005 (2013.01); F01D 9/023 (2013.01); F01D 25/243 (2013.01); F01D 25/246 (2013.01); F16J 15/32 (2013.01); F05D 2240/56 (2013.01)

(58) Field of Classification Search
CPC .......... F16J 15/02; F16J 15/022; F16J 15/024; F01D 9/023; F01D 9/041; F01D 25/243; F01D 25/246
See application file for complete search history.

(56) References Cited

U.S. PATENT DOCUMENTS

| | | | |
|---|---|---|---|
| 3,286,335 A * | 11/1966 | Di Pietra | F01D 11/00 29/281.1 |
| 5,400,586 A | 3/1995 | Bagepalli et al. | |
| 6,042,119 A | 3/2000 | Bagepalli et al. | |
| 6,547,257 B2 * | 4/2003 | Cromer | F01D 9/023 277/355 |
| 6,659,472 B2 | 12/2003 | Aksit et al. | |
| 7,090,224 B2 | 8/2006 | Iguchi et al. | |
| 7,178,340 B2 | 2/2007 | Jorgensen | |
| 7,246,995 B2 * | 7/2007 | Zborovsky | F01D 9/023 415/137 |
| 8,491,259 B2 | 7/2013 | Sutcu | |
| 8,511,972 B2 | 8/2013 | Sutcu | |
| 2012/0200046 A1 | 8/2012 | Green et al. | |
| 2012/0306168 A1 | 12/2012 | Gin | |

* cited by examiner

Primary Examiner — Ninh H. Nguyen
Assistant Examiner — Maxime M Adjagbe

(57) ABSTRACT

A gas turbine engine seal assembly (160) including: a rigid seal (58) cooperatively configured with a structure (14, 42) of a gas turbine engine to define a leakage path (102, 130) including a flow-controlling section (106, 134); and a compliant seal (162, 164) positioned in the leakage path.

17 Claims, 7 Drawing Sheets

SEAL ASSEMBLY IN A GAS TURBINE ENGINE

FIELD OF THE INVENTION

The invention relates to a seal assembly disposed between a transition duct and a first row of vanes in a gas turbine engine.

BACKGROUND OF THE INVENTION

Gas turbine engines having can combustors employ a transition duct to direct combustion gases from the combustor to a first row of vanes. In some configurations relative growth resulting from thermal transients during operation as well as relative movement that occurs during normal operation have been accounted for by installing rigid floating seal between the transition duct and the row one vanes. The transition-to-vane floating seal is configured to span a distance between a downstream end of the transition duct and the row one vanes, to permit relative radial and axial motion between a downstream end of the transition duct and the row one vanes, and to contain the gases.

In one configuration the same structure that enables the relative motions also creates a leakage path between the downstream end of the transition-to-vane floating seal and between the row one vane and the transition-to-vane floating seal. The transition duct, the floating seal, and the row one vanes are disposed in a plenum and are surrounded by cooling fluid that is normally at a slightly higher static pressure during operation. These leakage paths permit cooling fluid present in the plenum surrounding to leak into the combustion gases. The leaked air bypasses the combustor and hence does not contribute to the engine output, and this reduces the engine's efficiency. During transient pulsations the static pressure of the hot gases may temporarily spike to a static pressure above that in the plenum. This may cause a reversal of a flow direction in the leakage paths, thereby permitting hot combustion gases to enter and damage the leakage paths. Consequently, there remains room in the art for improvement.

BRIEF DESCRIPTION OF THE DRAWINGS

The invention is explained in the following description in view of the drawings that show.

DETAILED DESCRIPTION OF THE INVENTION

Figure 1:
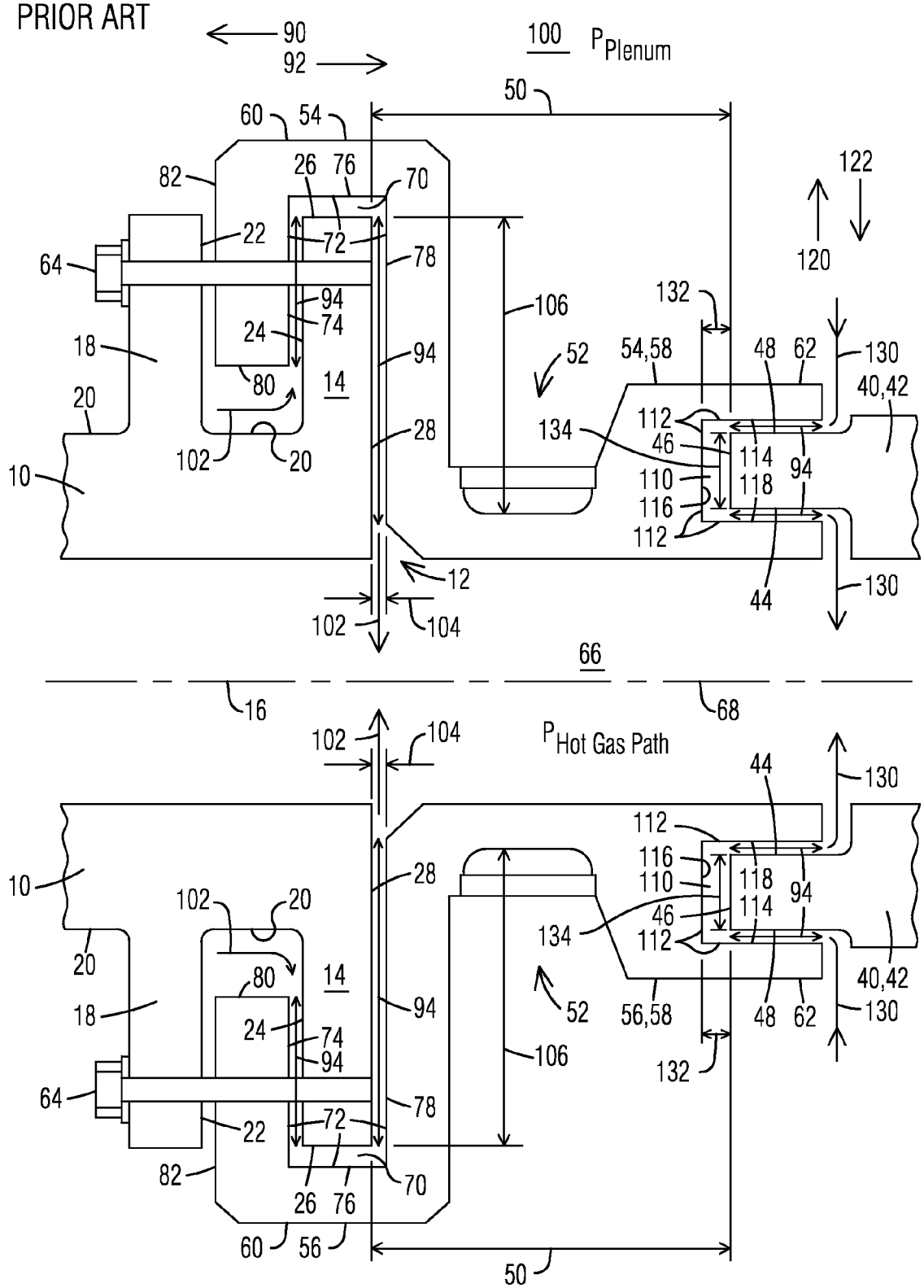
FIG. 1 is a cross sectional view of a prior art seal assembly.

The present inventor has devised an innovative seal assembly that provides an improved seal with a structure of a gas turbine engine. The seal assembly utilizes a rigid seal that is configured to provide a leakage path between the rigid seal and the structure and incorporates a compliant seal into the leakage path to further reduce leakage flow. In an exemplary embodiment the rigid seal may cooperate with the structure to form a flow controlling section in the flow path that provides control of a rate of leakage through the leakage path. In an exemplary embodiment the seal assembly may be configured to seal a gap between a transition duct outlet and a first row of guide vanes. However, the seal assembly is not so limited and may be located anywhere where the principles disclosed herein can be applied.

Normal operating conditions as well as transient operating conditions (e.g. start up, shut down etc.) often cause structures within a gas turbine engine to move/shift relative to each other. This relative movement may occur between the transition duct outlet and the row one vanes. Consequently, these components are often not rigidly secured to each other, but are instead secured to each other in a manner that anticipates and permits both axial and radial relative movement. In an exemplary embodiment this is accomplished by utilizing a rigid seal that floats between the transition duct outlet and the row one vanes. Floating enables the rigid seal to accommodate the relative movement and yet contain the combustion gases flowing from the transition duct to the row one vanes. The structural elements that enable the rigid seal to float may also create one or more leakage paths between the rigid seal and the transition duct and/or the row one vanes. The surfaces that define the leakage paths are the same surfaces that secure the rigid seal in place while enabling the floating action, and that carry the structural loads associated with the relative movement, and in some configuration, structural loads associated with limiting relative movement when maximums have been reached.

Typically it is preferred that no cooling air flow through the leakage paths, but since the rigid seal floats in order to accommodate changes in relative size and location of the transition duct and the row one vanes during thermal transients, a leakage flow path is typically present, which allows cooling air to pass through to the hot gas path. Consequently, it is desired to minimize this cooling air loss. This is because cooling air is only needed on the backside to cool components, and leakage of the cooling air into the hot gas path results in reduced engine performance, increased emissions, and flashback behavior in the combustor. The rigid seal has a thermal barrier coating on the hot gas path surface, and backside cooling is sufficient to keep it cool. Any additional surface cooling needed is precisely metered through cooling holes through the rigid seal.

Traditionally, any leakage that occurred has been seen as negligible and acceptable in order to optimize the freedom of the relative movement. However, improvements in engine efficiency and lower emissions requirements have caused attention to focus on better controlling leakage.

As a result, the inventor has devised a seal within a seal that reduces leakage flow. In the prior art arrangement, when the transition duct and the row one vanes were in a given relative positional relationship the rigid seal was still able to float within a range of its own positions. This is possible because the floating seal is designed to cover an entire range of relative positions, known herein as float. When the transition duct and the row one vanes are not in the most extreme positional relationship there is remaining/unused float, which is float not used to accommodate the relative positions of the transition duct and the row one vanes. The remaining float permits the floating seal to move with respect to the transition duct and the row one vanes. Uniquely, in some exemplary embodiments the sealing assembly disclosed herein provides a bias of the floating seal toward a favored configuration. Thus, this bias acts to control any remaining float in a manner most beneficial to the engine's performance.

FIG. 1 is a cross section showing a transition duct 10 having a transition duct outlet 12 and a transition duct flange 14 disposed around the transition duct 10 and oriented radially with respect to a transition duct longitudinal axis 16. A transition alignment tab 18 is disposed approximately in a middle of the transition duct 10 circumferentially (in and out of the page). The transition duct 10 includes a transition outer surface 20, the transition alignment tab 18 includes a tab aft-facing surface 22, and the transition duct flange 14 includes a transition flange forward-facing surface 24, a transition flange radially-facing surface 26, and a transition flange aft-facing surface 28.

Also partially visible are row one vanes 40 that define a row one vane ledge 42 that extends forward (upstream with respect to a flow of hot gases) from the row one vanes 40 to define a vane ledge inward-facing surface 44, a vane ledge forward-facing surface 46, and a vane ledge outward-facing surface 48 (all orientations with respect to the hot gases).

Disposed in a gap 50 between the transition duct 10 and the row one vanes 40 is a prior art seal assembly 52 including an outer seal 54 and an inner seal 56, each being a rigid seal and generally referred to herein as a floating seal 58. Each floating seal 58 includes a fore-end 60 and an aft-end 62. The fore-end 60 includes a forward groove 70 oriented radially and cooperatively configured to receive the transition duct flange 14 therein. This configuration permits the floating seal 58 to move radially with respect to the transition duct 10, thereby accommodating radial relative movement. A lateral positioning fastener 64 secured the floating seal 58 to the secures the floating seal 58 to the transition alignment tab 18 which holds the floating seal 58 in position circumferentially (into and out of the page). The floating seal 58 may be slotted radially (not shown) where the lateral positioning fastener 64 passes there through to permit the floating seal 58 to move radially.

The transition duct 10, the floating seals 58, and the row one vanes 40 define a hot gas path 66 having a hot gas path flow axis 68 in which combustion gases travel from a combustor (not shown) to a first row of rotor blades (not shown).

The following describes the floating seals 58 as shown in FIG. 1 from the perspective of the outer seal 54. The description also applies to the inner seal 56, although directional references (e.g. inner, inward, outer, outward) for the inner seal 56 would be reversed because reference is taken with respect to the hot gas path flow axis 68.

The forward groove 70 defines a forward groove inside surface 72 including a forward groove aft-facing surface 74, a forward groove radially-facing surface 76, and a forward groove forward-facing surface 78. The fore-end 60 also defines a fore-end inward-facing surface 80 and a fore-end forward-facing surface 82. During operation relative axial movement of the floating seal 58 in an upstream direction 90 is limited by an interaction of the transition flange aft-facing surface 28 with the forward groove forward-facing surface 78. Relative axial movement of the floating seal 58 in a downstream direction 92 is prevented by an interaction of the transition flange forward-facing surface 24 and the forward groove aft-facing surface 74. These limiting interactions delimit the permitted axial float of the floating seals 58.

Interactions between all movement-limiting surfaces occur at respective contact regions 94. Contact regions 94 are regions of facing surfaces; regions defined by actual contact between two contacting surfaces. For example, when limiting relative axial movement of the floating seal 58 in the upstream direction 90, the transition flange aft-facing surface 28 may contact the forward groove forward-facing surface 78 and limit the relative movement. The areas of actual contact there between define the respective contact region 94. A contact region 94 may change size and/or location on a respective surface during operation due to relative movements. While not originally designed to contact each other, over time and due to wear of various components the transition alignment tab 18 and the fore-end 60 may also contact each other.

The transition duct 10, the floating seal 58, and the row one vanes 40 are surrounded by a plenum 100 filled with compressed air at a plenum static pressure $P_{plenum}$. During normal operation the $P_{plenum}$ is greater than a static pressure of the compressed gases in the hot gas path $P_{hotgaspath}$. The structure of the transition duct 10 and the fore-end 60 provides a forward leakage path 102 between the transition duct 10 and the fore-end 60. The greater $P_{plenum}$ drives cooling fluid from the plenum 100, to the forward leakage path 102. If the contacting surfaces (e.g. the sealing surfaces) of a respective contact region 94 are contacted, then the forward leakage path 102 to the hot gas path 66 is closed and the cooling air in the plenum 100 keeps the components cool via backside cooling. Backside cooling of the seals 54, 56 is sufficient because the seals 54, 56 have a thermal barrier coating on surfaces exposed to the hot gas path 66, and any additional surface cooling needed is precisely metered through cooling holes (not shown) in the forward groove forward-facing surface 78. If the respective sealing surfaces have a gap there between, then cooling air can flow into the hot gas path 66, preventing infiltration of the hot combustion gases between the transition duct 10 and the floating seals 54, 56. The purpose of the floating seal 58 is to minimize or eliminate cooling air flow into the hot gas path 66 as well as hot gas ingestion into the seals 54, 56. Transient pulsations my temporarily reverse the relationships such that the $P_{hotgaspath}$ is greater than the $P_{plenum}$, in which case hot combustion gases may flow into the forward leakage path 102 and cause damage.

In this configuration the relative axial movement of the floating seal 58 in the upstream direction 90 is limited by the interaction of the transition flange aft-facing surface 28 with the forward groove forward-facing surface 78 in a manner that is designed to leave a forward controlled dimension 104 in the forward leakage path 102. The minimum design-dimension may be zero or non-zero. The forward controlled dimension 104 defines a flow controlling section 106 of the forward leakage path 102. Likewise, the relative axial movement of the floating seal 58 in a downstream direction 92 is limited by an interaction of the transition flange forward-facing surface 24 and the forward groove aft-facing surface 74 in a manner that enables a maximum dimension limit for the forward controlled dimension 104.

Controlling the forward controlled dimension 104 enables control of the flow area and associated flow rate through the forward leakage path 102. This also minimizes hot gas ingestion damage during pressure-ratio-reversing pulsations. However, the inventor has recognized that the forward leakage path 102 may leak more cooling fluid than is necessary for cooling purposes when the floating seal 58 is accommodating relative movement. Further, unless all of the available float is being used to accommodate relative movement between the transition duct 10 and the row one vanes 40, the floating seals 58 are free to use the remaining float for axial movement. Thus, the floating seal 58 may be in any number of axial positions for any given positional relationship between the transition duct 10 and the row one vanes 40. Since the position of the floating seal 58 controls the forward controlled dimension 104, and the forward leakage path 102, and the associated flow areas, the rate of leakage may vary for the given relationship between the transition duct 10 and the row one vanes 40. Thus, unless the floating seal 58 is in a relative position that provides the minimum flow rate for the available float, more cooling fluid is being leaked than necessary to account for the required float. This excess leakage of the prior art assembly reduces engine efficiency because the excess air could better be used in the combustion process. The reduction of air going to the combustor also reduces combustor operating margin, resulting in increased emissions and propensity for dynamics and flashback behavior. The reduced combustion margin may limit the maximum output of the operating gas turbine engine.

In this configuration the forward groove 70 is used to permit relative radial movement and limit excess relative axial movement. The floating seal aft-end 62 is used in a complementary manner to permit relative axial movement and limit excess relative radial movement. Together, the fore-end 60 and the floating seal aft-end 62 cooperate to accommodate the relative movement between the transition duct 10 and the row one vanes 40.

The floating seal aft-end 62 includes an aft groove 110 oriented axially and cooperatively configured to receive the row one vane ledge 42 therein. This configuration permits the floating seal 58 to move axially with respect to the transition duct 10, thereby accommodating radial and axial movement. The aft-groove defines an aft-groove inside surface 112 including an aft-groove inward-facing surface 114, an aft-groove aft-facing surface 116, and an aft-groove outward-facing surface 118. During operation relative radial movement of the floating seal 58 in an outward direction 120 is limited by an interaction of the vane ledge inward-facing surface 44 and the aft-groove outward-facing surface 118. Relative radial movement of the floating seal 58 in an inward direction 122 is limited by an interaction of the vane ledge outward-facing surface 48 and the aft-groove inward-facing surface 114. These limiting interactions delimit the permitted radial float of the floating seals 58. As with the fore-end 60, interactions between all movement-limiting surfaces occurs at respective contact regions 94.

The structure of the row one vanes 40 and the floating seal aft-end 62 provides an aft leakage path 130 between the row one vanes 40 and the floating seal aft-end 62. In a configuration the same limitations to relative axial movement that create and control the forward controlled dimension 104 also create and control an aft controlled dimension 132 of a design-minimum and maximum dimensions in the aft leakage path 130 between the aft-groove aft-facing surface 116 and the vane ledge forward-facing surface 46. The minimum design-dimension may be zero or non-zero. The aft controlled dimension 132 defines a flow-controlling section 134 of the aft leakage path 130. The greater $P_{plenum}$ drives cooling fluid from the plenum 100, to the aft leakage path 130. If the contacting surfaces (e.g. the sealing surfaces) of a respective contact region 94 are contacted, then the aft leakage path 130 to the hot gas path 66 is closed and the cooling air in the plenum 100 keeps the components cool via backside cooling. If the respective sealing surfaces have a gap there between, then cooling air can flow into the hot gas path 66, preventing infiltration of the hot combustion gases between the row one vanes 40 and the floating seals 54, 56.

Here again, the purpose of the floating seal 58 is to minimize or eliminate cooling air flow into the hot gas path 66 as well as hot gas ingestion into the seals 54, 56. Transient pulsations my temporarily reverse the relationships such that the $P_{hotgaspath}$ is greater than the $P_{plenum}$, in which case hot combustion gases may flow into aft leakage path 130 and cause damage.

Controlling the aft leakage path 130 likewise enables control of the flow area and associated flow rate through the aft leakage path 130. The aft leakage path 130 may also leak more than is necessary to account for the required float. Thus, the inventor has recognized that in a manner similar to the forward leakage path 102, excess leakage may occur through the prior art aft leakage path 130, and this may likewise reduce the engine's operating efficiency.

To reduce the excess leakage the inventor provides a compliant seal that is positioned to reduce and/or block leakage in at least one of the leakage paths. A compliant seal may be any seal that complies when acted upon by abutting surfaces. The compliant seal may be a resilient seal that wishes to return to its original shape when the abutting surface ceases acting on the compliant seal, such as a brush seal. Alternately, the compliant seal may be a non-resilient seal that maintains its volume, but which does not necessarily want to return to its original shape when acted upon, such as a rope seal and the like. The compliant seal may be a crushable seal that yields in a manner that changes it shape and reduces its volume, yet which does not wish to return to its original volume once the acting surface ceases its action, such as a honeycomb seal.

Figure 2:
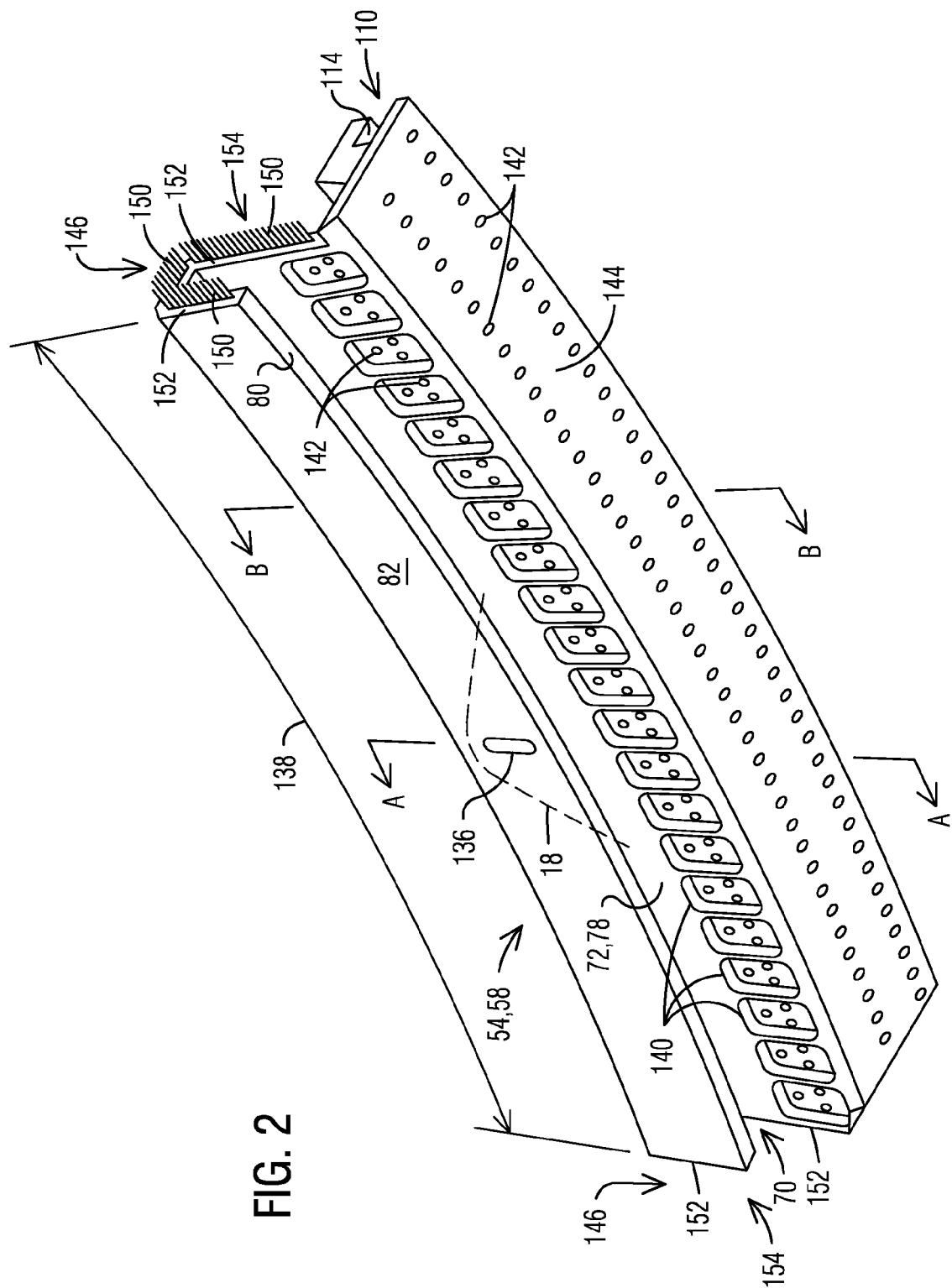
FIG. 2 is a perspective view of an outer seal disclosed herein.

FIG. 2 shows an exemplary embodiment of the outer seal 54 as disclosed herein looking up from the hot gas path 66. (The cross section of FIG. 1 is taken along line A-A of a prior art outer seal 54.) The transition alignment tab 18 is outlined with a dotted line to show its position relative to the floating seal 58. From this it can be seen that the transition alignment tab 18 aligns with a floating seal slot 136 for the lateral positioning fastener 64 (not shown), but is not as wide as a circumferential width 138 of the floating seal 58. Pockets 140 may be designed into the forward groove forward-facing surface 78 and cooling holes 142 may feed cooling fluid from the plenum 100 into the pockets 140 and/or through a hot gas path surface 144 of the floating seal 58. When the forward controlled dimension 104 is zero the forward leakage path 102 may be blocked almost completely. In this case cooling air from the cooling holes 142 in the pockets 140 provides most of the purging of the pockets 140 to cool and prevent hot gas ingestion.

In the assembled gas turbine engine several transition ducts 10 are disposed annularly around a rotor (not shown), and hence floating seals 58 are also positioned annularly around the rotor. In the prior art seal assembly there exists circumferential leakage paths between circumferentially adjacent floating seals 58. Circumferential leakage path 146 are indicated as shown. To limit leakage in the circumferential leakage path 146, one or more compliant seals 150 may be disposed on circumferential end-surfaces 152 of a circumferential end 154 of the floating seal 58.

Figure 3:
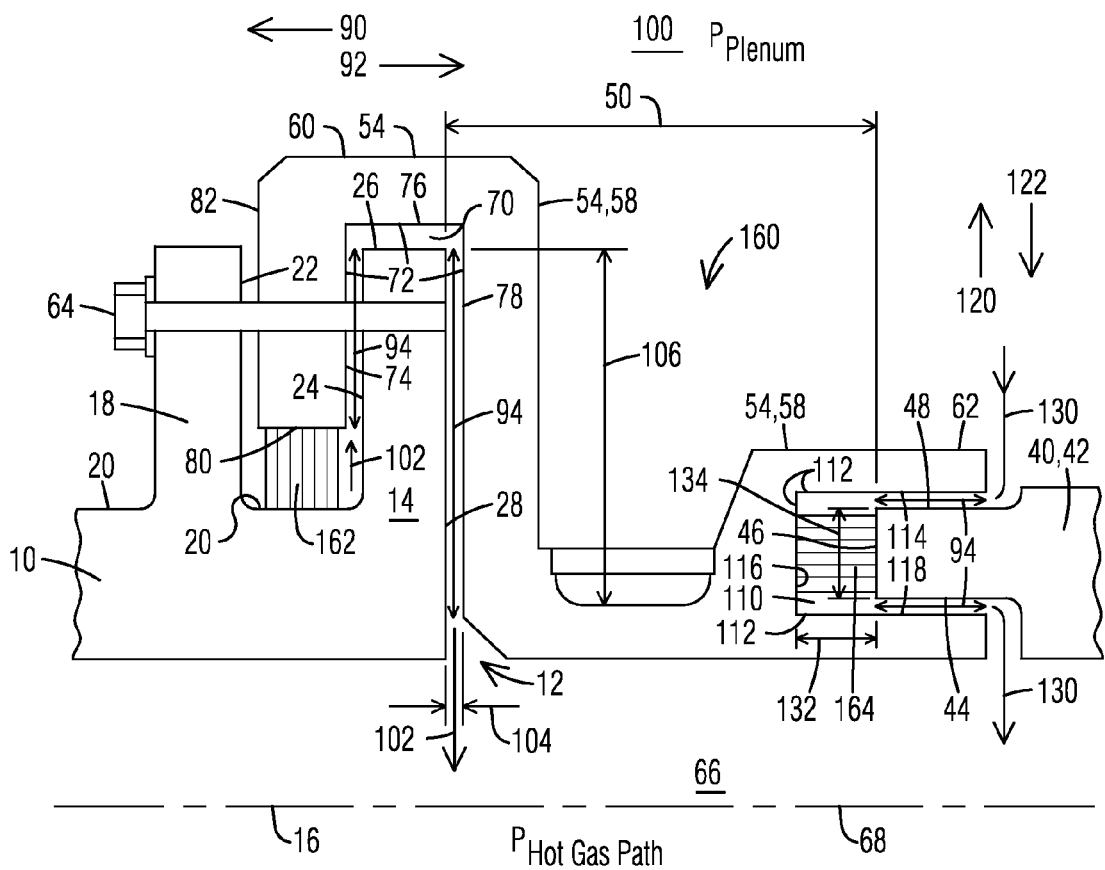
FIG. 3 is a cross sectional view of an exemplary embodiment of a seal assembly disclosed herein.

FIG. 3 shows a cross section along line A-A of FIG. 2 of an exemplary embodiment of the seal assembly 160 disclosed herein, which includes the floating seal 58 and one or both of a forward compliant seal 162 positioned such that it restricts and/or blocks flow in the forward leakage path 102, and a aft compliant seal 164 positioned such that it restricts and/or blocks flow in the aft leakage path 130. The forward compliant seal 162 is disposed between the floating seal 58 and the transition outer surface 20. The aft compliant seal 164 is disposed in the aft groove 110 between the aft-groove aft-facing surface 116 and the vane ledge forward-facing surface 46.

In any exemplary embodiment the compliant seals 162, 164 may be secured to either or both of the surfaces it spans. In an exemplary embodiment the compliant seals 162, 164 are secured to the floating seal 58. This may facilitate a retrofit of a prior art seal assembly 52 with the seal assembly 160 disclosed herein. In such an exemplary embodiment upgrading would simply require replacing the prior art seal assembly 52 with a unitary seal assembly 160 without any need to position the compliant seals 162, 164.

The compliant seals 162, 164 may be positioned remote from contact regions 94. This ensures that structural loads associated with relative repositioning of the transition duct 10 and/or the row one vanes 40 and born by the floating seal 58 are carried primarily by the floating seal 58 and not the compliant seals 162, 164. This extends the life of the compliant seal. In exemplary embodiments where a resilient seal is used, locating the resilient seals remote from the contact regions 94 helps keep the resilient seals within their elastic range of motion. Remaining within their elastic range of motion helps ensure that the resilient seals rebound properly to maintain the flow restricting/blocking function. Otherwise, if plastically deformed, the resilient seals may not rebound sufficiently and the restricting/blocking function effectiveness may be reduced and or rendered ineffective.

In exemplary embodiments where one or more of the compliant seals is a resilient seal, the location of one or both of the resilient seals may be chosen to take advantage of the inherent resilience. For example, in the exemplary embodiment shown, a resilience of the aft compliant seal 164 would urge the floating seal 58 in the upstream direction 90. In instances when there is remaining float available to the floating seal 58, this would tend to minimize the forward controlled dimension 104. This, in turn, reduces a flow area of the forward leakage path 102, which reduces the flow rate there through to the point where only the minimum acceptable leakage flow rate is achieved. This results in a minimum flow configuration. The excess compressed air that may have flowed through the forward leakage path 102 in the prior art now instead flows into the combustor, increasing the engine's operating efficiency and combustion margin.

Likewise, a resilience of the forward compliant seal 162 would urge the floating seal 58 in the outward direction 120. In instances when there is remaining float available to the floating seal 58, this would tend to move the aft-groove outward-facing surface 118 toward the vane ledge inward-facing surface 44. This would restrict the aft leakage path 130, and associated flow area and flow rate there through. The excess compressed air that may have flowed through the aft-leakage path 130 in the prior art now instead also flows into the combustor, increasing the engine's operating efficiency. Consequently, this biasing can be seen as configured to maximize engine efficiency.

Figure 4:
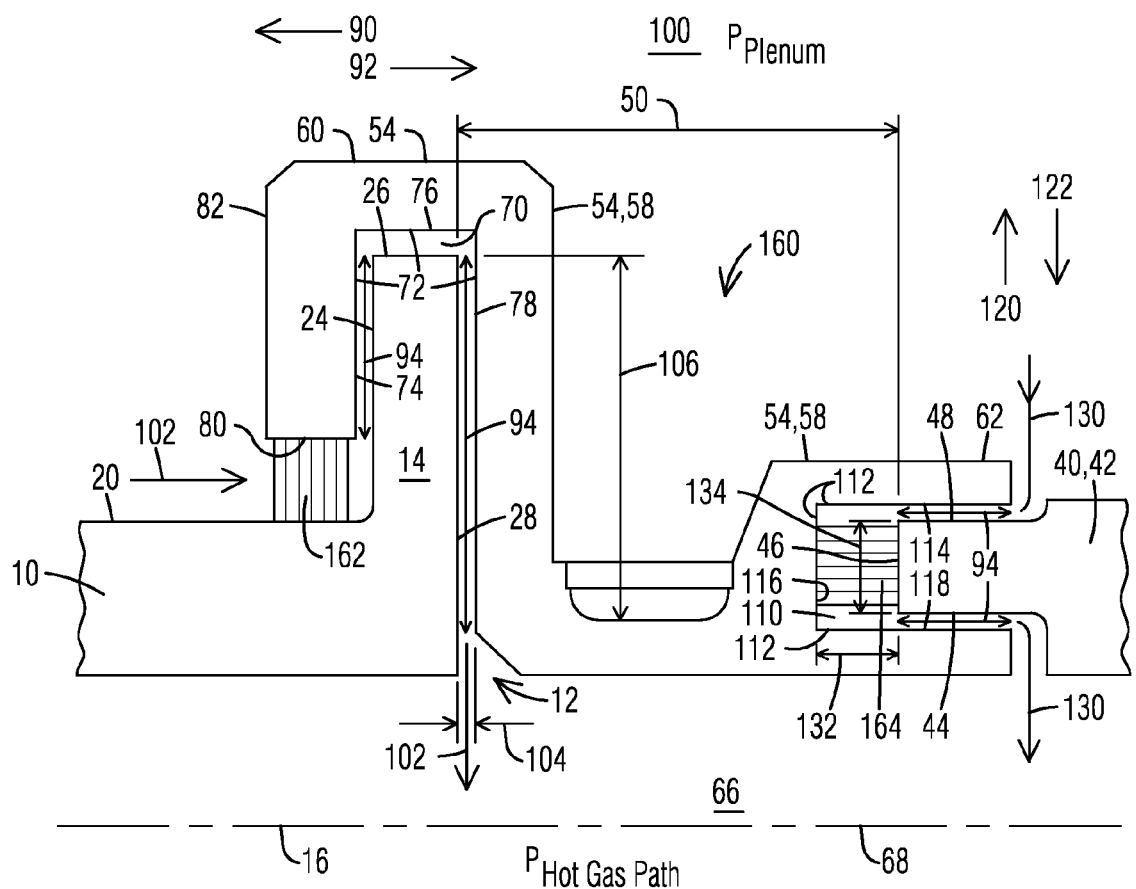
FIG. 4 is another cross sectional view of the exemplary embodiment of the seal assembly of FIG. 3.

FIG. 4 shows the sealing assembly 160 of FIG. 3, but where the cross section is taken along line B-B of FIG. 2. The different circumferential location of the cross section highlights that the transition alignment tab 18 is not present along the entire circumferential width 138 of the floating seal 58. As a result, a cross section of the forward leakage path 102 varies slightly depending on where (circumferentially/along the width) on the transition duct 10 it is taken.

Figure 5:
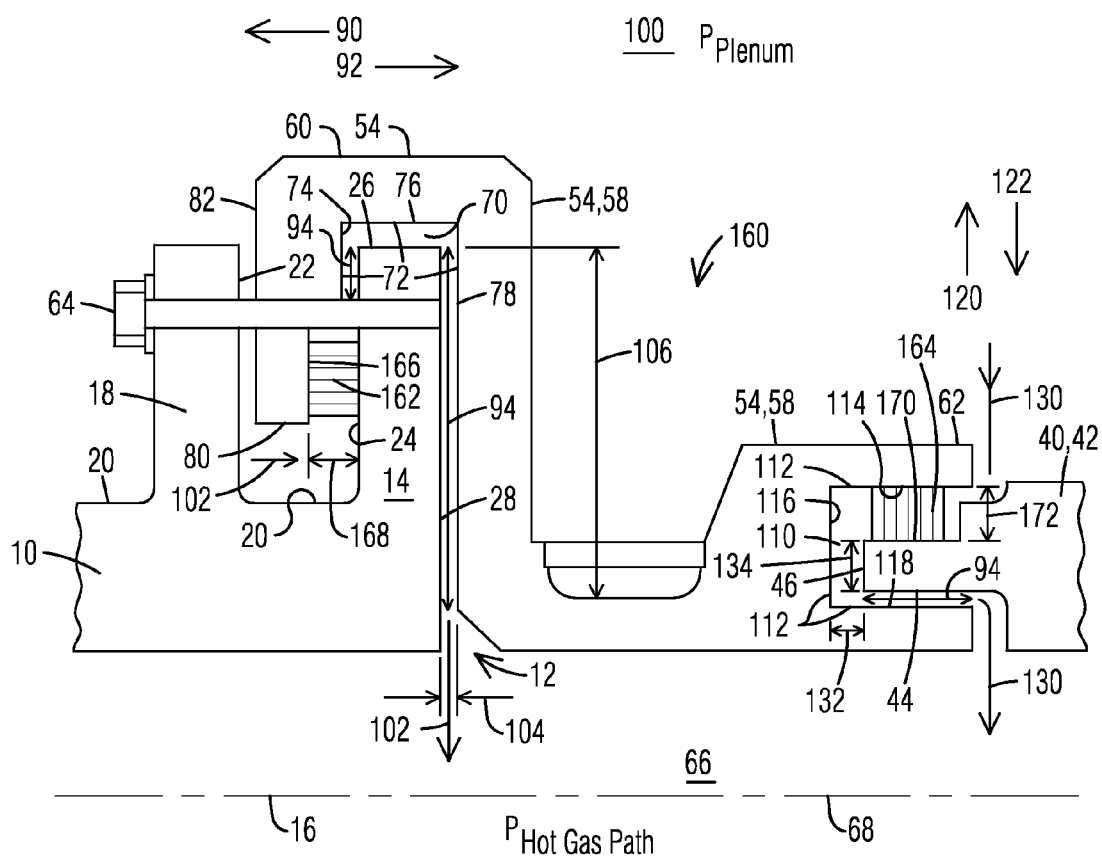
FIG. 5 is an alternate embodiment of the seal assembly disclosed herein.

FIG. 5 shows a cross section along line A-A of FIG. 2 of an alternate exemplary embodiment of the seal assembly 160 disclosed herein, which includes the floating seal 58 and one or both of the forward compliant seal 162 disposed in the forward groove 70 and the aft compliant seal 164 disposed in the aft groove 110. The first compliant seal is disposed on a forward recessed surface 166 set back from the forward groove aft-facing surface 74 enough to create a forward recess 168 large enough to enable a resilient seal to remain within its elastic deformation range. When disposed in the forward groove 70, such a recessed surface is considered to be part of the inside surface 72 of the forward groove 70. Alternately, the forward compliant seal 162 could be disposed anywhere within the forward groove 70. The second compliant seal is likewise disposed on an aft recessed surface 170 set back from the aft-groove inward-facing surface 114 enough to create an aft recess 172 large enough to enable a resilient seal to remain within its elastic deformation range. Alternately, the aft compliant seal 164 could be disposed anywhere within the aft groove 110.

When the forward compliant seal 162 is a resilient seal, in this configuration its resilience urges the floating seal 58 in the upstream direction 90. In instances when there is remaining float available to the floating seal 58, this would also tend to minimize the forward controlled dimension 104. This, reduces excess leakage and increases engine efficiency.

When the aft compliant seal 164 is a resilient seal, in this configuration its resilience urges the floating seal 58 in the outward direction 120. In instances when there is remaining float available to the floating seal 58, this would tend to move the aft-groove outward-facing surface 118 toward the vane ledge inward-facing surface 44. This would restrict the aft leakage path 130, and associated flow area and flow rate there through, and increase the engine's efficiency. Consequently, this biasing can also be seen as configured to maximize engine efficiency.

Figure 6:
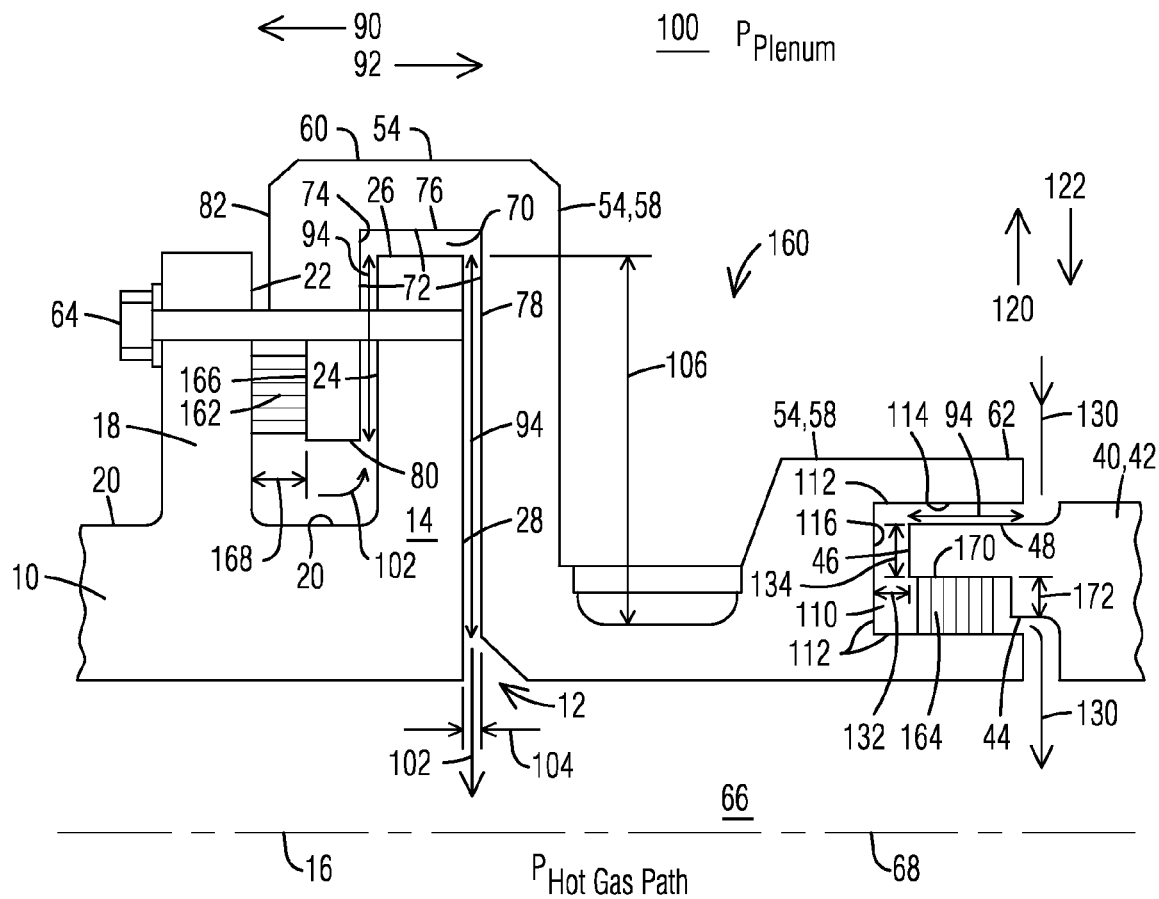
FIG. 6 is an alternate embodiment of the seal assembly disclosed herein.

FIG. 6 shows a cross section along line A-A of FIG. 2 of an alternate exemplary embodiment of the seal assembly 160 disclosed herein, which includes the floating seal 58 and one or both of the forward compliant seal 162 disposed as shown and the aft compliant seal 164 disposed in the aft groove 110. The first compliant seal is disposed on a forward recessed surface 166 set back from the fore-end forward-facing surface 82 enough to create a forward recess 168 large enough to enable a resilient seal to remain within its elastic deformation range. The second compliant seal is likewise disposed on an aft recessed surface 170 set back from the vane ledge inward-facing surface 44 enough to create an aft recess 172 large enough to enable a resilient seal to remain within its elastic deformation range.

When the forward compliant seal 162 is a resilient seal, in this configuration its resilience urges the floating seal 58 in the downstream direction 92. In instances when there is remaining float available to the floating seal 58, this would also tend to minimize a gap between the forward groove aft-facing surface 74 and the transition flange forward-facing surface 24, thereby restricting or blocking the forward leakage path 102 and increasing engine efficiency.

When the aft compliant seal 164 is a resilient seal, in this configuration its resilience urges the floating seal 58 in the inward direction 122. In instances when there is remaining float available to the floating seal 58, this would tend to move the aft-groove inward-facing surface 114 toward the vane ledge outward-facing surface 48. This would restrict the aft leakage path 130, and associated flow area and flow rate there through, and increase the engine's efficiency. Consequently, this biasing can also be seen as configured to maximize engine efficiency. Any combination of FIGS. 4, 5, and 6 can be used as desired.

Biasing schemes are not limited to those that maximize the engine's efficiency. For example, biasing schemes may have alternate or additional benefits. For example, the static pressure difference between $P_{plenum}$ and $P_{hotgaspath}$ urges the floating seal in the inward direction 122. This tends to open the aft leakage path 130 between the aft-groove outward-facing surface 118 and the vane ledge inward-facing surface 44. This puts a relatively large portion of the aft leakage path 130 close to the hot gas path 66, potentially exposing more material to the hot combustion gases. If the second compliant seal is located as shown in FIG. 3, it will have little influence on the inward and outward movement on the floating seal 58. However, when positioned as shown in FIG. 5, a resilient aft compliant seal 164 would urge the floating seal 58 in the outward direction 120, against the inward urge created by a normal (e.g. steady state) pressure difference. The amount of resilience selected may be selected to match, overcome, or not overcome the urging created by the pressure difference, depending on steady state design preference.

During a transient, the pressure difference reverses depending on the duration, the reversal of the pressure difference may reduce or reverse the pressure induced urging on the floating seal 58 such that it may be urged in the outward direction 120 for a time. When positioned as shown in FIG. 5, when a resilient seal is used, the resilience would cooperate with the outward force created by the pressure difference reversal and urge the aft-groove outward-facing surface 118 toward the vane ledge inward-facing surface 44. The pressure difference induced outward urging together with the resilience induced outward urging thus work together to create a check-valve action in the aft leakage path 130. This creates a blockage in the aft leakage path at a location that is as close as possible to the hot gas path 66. As a result, intrusion of hot gases into the hot gas path will be limited, if not prevented. The seal assembly 160 is thereby essentially configured to protect itself from the damaging intrusion of hot combustion gases. Placing the aft compliant seal 164 in the location seen in FIG. 5 also puts it downstream of the blockage with respect to intruding hot combustion gases, thereby protecting the relatively thermally sensitive compliant seal. In this configuration the sealing assembly 160 increases engine efficiency, reduces steady state leakage, and may also be effective in protecting itself by being a check valve with respect to the direction of flow through the leakage path.

Figure 7:
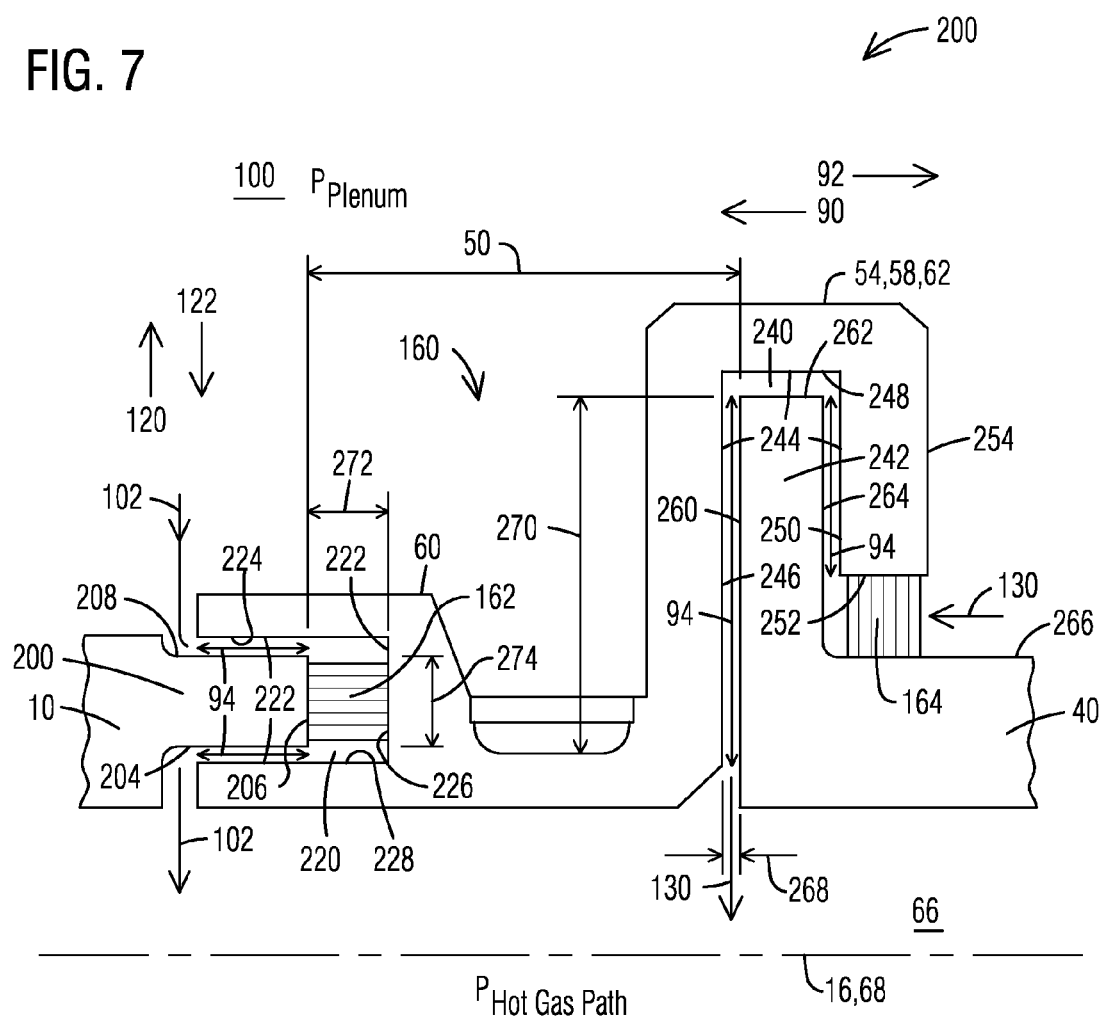
FIG. 7 is an alternate embodiment of the seal assembly disclosed herein.

FIG. 7 shows a cross section along line A-A of FIG. 2 of an alternate exemplary embodiment of the seal assembly 160 where the transition duct 10 ends in a transition ledge 200 having a transition ledge inward-facing surface 204, a transition ledge aft-facing surface 206, and a transition ledge outward-facing surface 208 (all orientations with respect to the hot gases). (The transition alignment tab 18 is not shown in this figure.) The floating seal fore-end 60 includes a forward groove 220 oriented axially and cooperatively configured to receive the transition ledge 200 therein. This configuration permits the floating seal 58 to move axially with respect to the transition duct 10. The forward groove 220 defines a forward groove inside surface 222 including a forward groove inward-facing surface 224, a forward groove forward-facing surface 226, and a forward groove outward-facing surface 228.

During operation relative radial movement of the floating seal 58 in the outward direction 120 is limited by an interaction of the transition ledge inward-facing surface 204 and the forward groove outward-facing surface 228. Relative radial movement of the floating seal 58 in the inward direction 122 is limited by an interaction of the transition ledge outward-facing surface 208 and the forward groove inward-facing surface 224. These limiting interactions delimit the permitted radial float of the floating seals 58. Interactions between all movement-limiting surfaces occurs at respective contact regions 94. The forward leakage path 102 is between the transition ledge 200 and the forward groove 220.

In this exemplary embodiment the forward compliant seal 162 is disposed in the forward leakage path 102 between the transition ledge aft-facing surface 206 and the forward groove forward-facing surface 226. As above, the flow through the forward leakage path 102 is controlled by the relative movement of the floating seal 58.

The aft end 62 of the floating seal 58 includes an aft-groove 240 oriented radially and cooperatively configured to receive a row one vane flange 242 therein. This configuration permits the floating seal 58 to move radially with respect to the row one vane 40, thereby accommodating radial relative movement. The aft-groove 240 defines an aft groove inside surface 244 including an aft groove aft-facing surface 246, an aft groove radially-facing surface 248, and an aft groove forward-facing surface 250. The aft-end 60 also defines an aft-end inward-facing surface 252 and an aft-end rearward-facing surface 254.

The row one vane flange 242 includes a row one vane flange forward-facing surface 260, a row one vane flange radially-facing surface 262, and a row one vane flange aft-facing surface 264. The row one vane 40 also includes a row one vane outer surface 266 disposed adjacent the row one vane flange 40. The aft leakage path 130 is between the aft-groove 240 and the row one vane flange 242. In this exemplary embodiment the aft compliant seal 164 is disposed in the aft leakage path 130 between the aft-end inward-facing surface 252 and the row one vane outer surface 266. The aft groove aft-facing surface 246 and the row one vane flange forward-facing surface 260 define an aft controlled dimension 268. An aft controlled dimension 268 defines a flow controlling section 270 of the aft leakage path 130. A forward controlled dimension 272 defines a flow-controlling section 274 of the forward leakage path 102.

During operation relative axial movement of the floating seal 58 in the upstream direction 90 is limited by an interaction of the aft groove forward-facing surface 250 and the row one vane flange aft-facing surface 264. Relative axial movement of the floating seal 58 in a downstream direction 92 is prevented by an interaction of the aft groove aft-facing surface 246 and the row one vane flange forward-facing surface 260. These limiting interactions delimit the permitted axial float of the floating seals 58. The aft leakage path 130 is between the aft-groove 240 and the row one vane flange 242. As above, the flow through the aft leakage path 130 is controlled by the relative movement of the floating seal 58.

When the forward compliant seal 162 is a resilient seal, its resilience urges the floating seal 58 in the downstream direction 92, thereby urging the aft groove aft-facing surface 246 toward the row one vane flange forward-facing surface 260 and restricting the aft leakage path 130. In instances when there is remaining float available to the floating seal 58, this would also tend to minimize a gap between the aft groove aft-facing surface 246 and the row one vane flange forward-facing surface 260.

When the aft compliant seal 164 is a resilient seal, its resilience urges the floating seal radially outward, thereby urging the forward groove outward-facing surface 228 toward the transition ledge inward-facing surface 204 and restricting the forward leakage path 102. In instances when there is remaining float available to the floating seal 58, this would also tend to minimize a gap between the forward groove outward-facing surface 228 and the transition ledge inward-facing surface 204. All of the principles and interactions applied to the structures of the exemplary embodiments disclosed above apply to the structures of this exemplary embodiment.

Any combination of FIGS. 4, 5, 6, and 7 can be used as desired. Accordingly, the seal assembly 160 may be considered as including: a first component having a flange; a second component having a ledge and being spaced apart by a gap and positioned end-to-end with the first component; and a floating seal disposed there between and having a first groove for the flange and a second groove for the ledge. The flange and the first groove may define a first leakage path there between. The ledge and the second groove may define a second leakage path there between. A leakage path compliant seal may be disposed in at least one of the leakage paths. A second leakage path compliant seal may be disposed in another of the leakage paths. Considered this way, the first component may be the transition duct when the transition duct includes the transition flange, in which case the second component may be the row one vane when the row one vane includes the row one vane ledge. Alternately, the first component may be the row one vane when the row one vane includes the row one vane flange, in which case the second component may be the transition duct when the transition duct includes the transition ledge. Any and all combinations of the above may be employed as necessary.

From the foregoing it can be seen that the inventor has recognized a location where excess leakage may occur, and has implemented a seal-in-seal solution that not only reduces the excess leakage, but does so in a way that maximizes the leakage reduction for any given positional relationship of the components being sealed. Further, the implemented sealing assembly may be configured to protect itself in the event of pressure transients that would otherwise permit damaging hot combustion gases intrusion into the seal assembly. Consequently, this represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A gas turbine engine seal assembly comprising:
a rigid seal cooperatively configured with a structure of a gas turbine engine to define a leakage path there between comprising a flow-controlling section; and
a compliant seal positioned in the leakage path,
wherein the compliant seal comprises a resilient seal, and a resilience of the resilient seal moves the rigid seal toward the structure, thereby minimizing the flow-controlling section.

2. The seal assembly of claim 1, wherein the compliant seal is disposed in the leakage path and remote from the flow-controlling section.

3. The seal assembly of claim 1, wherein the compliant seal is disposed in the flow-controlling section.

4. The seal assembly of claim 1, wherein the compliant seal comprises a brush seal.

5. A gas turbine engine seal assembly comprising:
a first component and a second component spaced apart by a gap and defining a hot gas path, wherein the first component comprises a flange, wherein the second component comprises a ledge that extends toward the flange;
a floating seal spanning the gap and comprising a first groove oriented radially and configured to receive and permit relative radial movement of the flange and a second groove oriented axially and configured to receive and permit relative axial movement of the ledge;
contact regions between the floating seal and the flange and between the floating seal and the ledge that define limits of relative movement of the floating seal with respect to the flange and the ledge during operation;
wherein the flange and the first groove define a first leakage path there between, and wherein the second groove and the ledge define an second leakage path there between; and
a leakage path compliant seal disposed in a location remote from the contact regions and where the leakage path compliant seal forms a restriction in one of the leakage paths, and
wherein the leakage path compliant seal comprises a resilient seal, and a resilience of the resilient seal moves the floating seal.

6. The seal assembly of claim 5, comprising a second leakage path compliant seal disposed in a second location remote from the contact regions and where the leakage path compliant seal forms a restriction in one leakage path and the second leakage path compliant seal form a restriction in a remaining one of the leakage paths.

7. The seal assembly of claim 5, wherein the leakage path compliant seal spans between the floating seal and a radially outer surface of the first component that is adjacent the flange.

8. The seal assembly of claim 5, wherein the leakage path compliant seal comprises a resilient seal, and a resilience of the of the resilient seal urges the floating seal radially with respect to the first component, and this urges an inside surface of the second groove toward the ledge.

9. The seal assembly of claim 5, wherein the leakage path compliant seal spans from an inside surface of the first groove to the flange.

10. The seal assembly of claim 9, wherein the leakage path compliant seal comprises a resilient seal, and a resilience of the resilient seal urges the floating seal axially with respect to the flange, and this urges the inside surface of the first groove against the flange.

11. The seal assembly of claim 5, wherein the leakage path compliant seal spans between an inside surface of the second groove an axially facing surface of the ledge.

12. The seal assembly of claim 5, wherein the leakage path compliant seal spans between an inside surface of the second groove and either a ledge outward-facing surface or a ledge inward-facing surface.

13. The seal assembly of claim 12, wherein the leakage path compliant seal comprises a resilient seal, and a resilience of the resilient seal urges the floating seal radially with respect to the ledge, and this urges the inside surface of the second groove toward an opposite-facing surface of the ledge.

14. The seal assembly of claim 5, further comprising a circumferential leakage path compliant seal disposed at a circumferential end of the floating seal and configured to span to a circumferentially adjacent floating seal.

15. A method of providing a seal assembly in a gas turbine engine, comprising:
  removing a rigid seal flow-controlling seal member from the gas turbine engine; and
  replacing the rigid seal flow-controlling seal member with a seal assembly comprising: a rigid seal member to define a leakage path between the rigid seal member and a structure of the gas turbine engine; and a compliant seal positioned in the leakage path, and
  wherein the leakage path comprises a flow-controlling section, wherein the compliant seal comprises a resilient seal, and wherein a resilience of the resilient seal moves the rigid seal member in a direction that creates a minimum flow configuration of the flow-controlling section.

16. The method of claim 15, wherein the leakage path comprises a flow-controlling section, the method further comprising positioning the compliant seal remote from the flow-controlling section.

17. The method of claim 15, wherein the leakage path comprises a flow-controlling section, the method further comprising positioning the compliant seal within the flow-controlling section.

* * * * *